(12) United States Patent
Watanabe et al.

(10) Patent No.: US 11,302,937 B2
(45) Date of Patent: Apr. 12, 2022

(54) ELECTRIC POWER SUPPLY CONTROL APPARATUS FOR VEHICLE AND ELECTRIC POWER SUPPLY CONTROL METHOD FOR VEHICLE

(71) Applicant: SUBARU CORPORATION, Tokyo (JP)

(72) Inventors: Ken Watanabe, Tokyo (JP); Ryohei Hoshi, Tokyo (JP); Fumiyuki Moriya, Tokyo (JP); Hirofumi Yabe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 122 days.

(21) Appl. No.: 16/557,592

(22) Filed: Aug. 30, 2019

(65) Prior Publication Data
US 2020/0106113 A1    Apr. 2, 2020

(30) Foreign Application Priority Data
Oct. 2, 2018 (JP) .............................. JP2018-187240

(51) Int. Cl.
| | |
|---|---|
| H01M 8/04 | (2016.01) |
| H01M 8/04007 | (2016.01) |
| H01M 8/04858 | (2016.01) |
| H01M 8/04537 | (2016.01) |
| H01M 8/0432 | (2016.01) |
| B60H 1/14 | (2006.01) |

(52) U.S. Cl.
CPC .......... *H01M 8/04037* (2013.01); *B60H 1/14* (2013.01); *H01M 8/04358* (2013.01); *H01M 8/04626* (2013.01); *H01M 8/04947* (2013.01)

(58) Field of Classification Search
CPC ......... H01M 8/04037; H01M 8/04626; H01M 8/04947; B60L 3/00; B60L 3/0046; B60L 50/50; B60L 50/60; B60L 58/10; B60L 58/25; B60L 2240/34
USPC ........................................................ 429/434
See application file for complete search history.

(56) References Cited

U.S. PATENT DOCUMENTS

2017/0093316 A1* 3/2017 Toyora .................... B60L 58/20
2018/0111497 A1* 4/2018 Li ........................... B60L 58/15

FOREIGN PATENT DOCUMENTS

JP        2012-044849 A    3/2012

\* cited by examiner

*Primary Examiner* — James M Erwin
(74) *Attorney, Agent, or Firm* — McGinn IP Law Group, PLLC

(57) ABSTRACT

The electric power supply control apparatus for a vehicle executes a driving prioritizing mode in which a supply of driving electric power is prioritized over a supply of temperature controlling electric power, and a temperature control prioritizing mode in which the supply of the temperature controlling electric power is prioritized over the supply of the driving electric power. While the modes are switched over, the apparatus controls the driving electric power or the temperature controlling electric power so that a sum of the powers stays at an upper limit value or smaller.

16 Claims, 5 Drawing Sheets

ELECTRIC POWER SUPPLY CONTROL APPARATUS FOR VEHICLE AND ELECTRIC POWER SUPPLY CONTROL METHOD FOR VEHICLE

CROSS-REFERENCE TO RELATED APPLICATION

The present application claims priority from Japanese Patent Application No. 2018-187240 filed on Oct. 2, 2018, the entire contents of which are hereby incorporated by reference.

BACKGROUND

The disclosure relates to an electric power supply control apparatus for a vehicle.

Conventionally, there has been known an electric power supply control apparatus for a vehicle including an electric motor capable of generating a driving force of the vehicle by receiving driving electric power from a battery and a temperature controller capable of controlling the temperature in a vehicle cabin by receiving temperature controlling electric power from the battery. For example, in Japanese Unexamined Patent Application (JP-A) No. 2012-44849, a control apparatus of an electric vehicle controls electric power so that a sum of electric power for driving an electric motor and electric power that an in-cabin air conditioner can consume becomes equal to or smaller than a maximum permissible output of a battery pack. Then, as the maximum permissible output decreases, initially, the consumable electric power by the in-cabin air conditioner is decreased towards a lowest ensuring electric power from a maximum electric power while maintaining the electric power for driving the electric motor at a substantially constant driving power ensuring electric power, whereby priority is given to the driving performance of the vehicle. Next, when the consumable electric power by the in-cabin air conditioner arrives at the lowest ensuring electric power, the decrease in consumable electric power is stopped, so that the consumable electric power is maintained at the lowest ensuring electric power, while the electric power for driving the electric motor is decreased below the driving power ensuring electric power whereby priority is given to the operation of the in-cabin air conditioner.

SUMMARY

An aspect of the disclosure provides an electric power supply control apparatus for a vehicle. The vehicle includes a battery, an electric motor configured to generate a driving force of the vehicle by receiving driving electric power from the battery, and a temperature controller configured to heat or cool at least one of a vehicle cabin and the battery by receiving temperature controlling electric power from the battery. The apparatus is configured to execute a driving prioritizing mode in which a supply of the driving electric power is prioritized over a supply of the temperature controlling electric power within a range of an upper limit value of a predetermined driving electric power and a temperature control prioritizing mode in which a supply of the temperature controlling electric power is prioritized over a supply of the driving electric power within a range of an upper limit value of a predetermined temperature controlling electric power upper limit value. While the driving prioritizing mode and the temperature control prioritizing mode are switched over, the apparatus is configured to control the driving electric power or the temperature controlling electric power so that a sum of the driving electric power and the temperature controlling electric power stays at a total electric power upper limit value or smaller. The total electric power upper limit value is an upper limit value of electric power that can be used by at least one of the electric motor and the temperature controller within electric power that can be output by the battery.

An aspect of the disclosure provides an electric power supply control method for a vehicle. The vehicle includes a battery, an electric motor configured to generate a driving force of the vehicle by receiving driving electric power from the battery, and a temperature controller configured to heat or cool at least one of a vehicle cabin and the battery by receiving temperature controlling electric power from the battery. The method includes executing a driving prioritizing mode in which a supply of the driving electric power is prioritized over a supply of the temperature controlling electric power within a range of an upper limit value of a predetermined driving electric power and a temperature control prioritizing mode in which a supply of the temperature controlling electric power is prioritized over a supply of the driving electric power within a range of an upper limit value of a predetermined temperature controlling electric power upper limit value. The method includes controlling the driving electric power or the temperature controlling electric power in such a manner that a sum of the driving electric power and the temperature controlling electric power stays at a total electric power upper limit value or smaller while the driving prioritizing mode and the temperature control prioritizing mode are switched over. The total electric power upper limit value is an upper limit value of electric power that can be used by at least one of the electric motor and the temperature controller within electric power that can be output by the battery.

An aspect of the disclosure provides an electric power supply control apparatus for a vehicle. The vehicle includes a battery, an electric motor configured to generate a driving force of the vehicle by receiving driving electric power from the battery, and a temperature controller configured to heat or cool at least one of a vehicle cabin and the battery by receiving temperature controlling electric power from the battery. The apparatus includes circuitry. The circuitry is configured to execute a driving prioritizing mode in which a supply of the driving electric power is prioritized over a supply of the temperature controlling electric power within a range of an upper limit value of a predetermined driving electric power and a temperature control prioritizing mode in which a supply of the temperature controlling electric power is prioritized over a supply of the driving electric power within a range of an upper limit value of a predetermined temperature controlling electric power upper limit value. While the driving prioritizing mode and the temperature control prioritizing mode are switched over, the circuitry is configured to control the driving electric power or the temperature controlling electric power so that a sum of the driving electric power and the temperature controlling electric power stays at a total electric power upper limit value or smaller. The total electric power upper limit value is an upper limit value of electric power that can be used by at least one of the electric motor and the temperature controller within electric power that can be output by the battery.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the following, some embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

The technique described in JP-A No. 2012-44849 takes into no consideration of a possibility that in switching modes of the vehicle between a mode where priority is given to the driving performance of the vehicle and a mode where priority is given to the operation of the in-cabin air conditioner, the sum of electric power consumed by the electric motor, that is, driving electric power and electric power consumed by the in-cabin air conditioner, that is, temperature controlling electric power exceeds the maximum permissible output of the battery pack.

Then, the disclosure has been made in view of the problem described above, and it is desirable to provide a novel and improved electric power supply control apparatus for, restraining the sum of driving electric power and temperature controlling electric power from exceeding a total electric power upper limit value while switching modes of the vehicle between the driving prioritizing mode and the temperature control prioritizing mode, when the upper limit value of electric power, within electric power capable of outputting for the battery and allowing at least one of the electric motor and the temperature controller to use, is referred to as the total electric power upper limit value.

Figure 1:
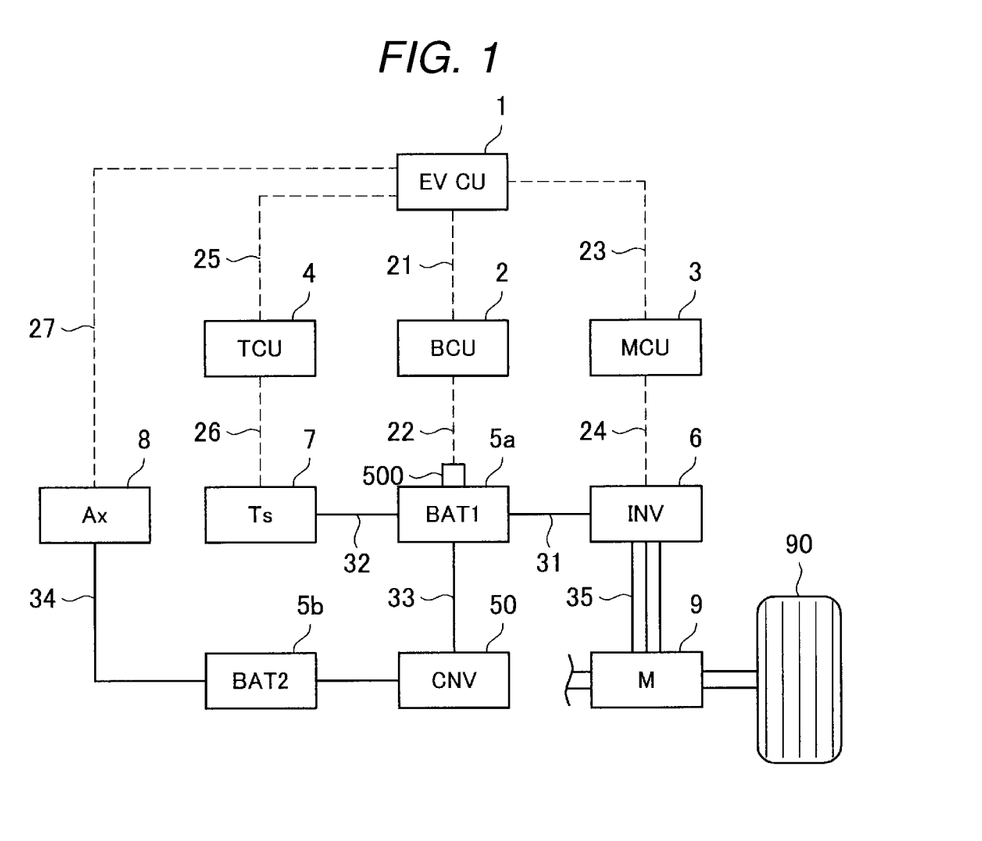
FIG. 1 is a schematic diagram illustrating a schematic configuration of a power supply system of an electric vehicle according to an embodiment of the disclosure.

Firstly, referring to FIG. 1, a schematic configuration of an electric power supply apparatus according an embodiment of the disclosure will be described. The electric power supply control apparatus is mounted on an electrically driven vehicle such as an electric vehicle. As illustrated in FIG. 1, the electrically driven vehicle, that is, an electric vehicle includes a high-voltage battery 5a, a low-voltage battery 5b, a motor 9, a temperature controller 7, and an auxiliary device 8.

The high-voltage battery 5a is a secondary battery and functions as a power source for the motor 9 and the temperature-controller 7. The high-voltage battery 5a is coupled to an inverter 6, the temperature-controller device 7, and a DC/DC converter 50 via power supply lines 31, 32, 33, respectively. An electric power of the high-voltage battery 5a is dropped down by the DC/DC converter 50 and is supplied to the low-voltage battery 5b. The high-voltage battery 5a may be a primary battery, a fuel cell, or the like.

The motor 9 is an electric motor and is, for example, a three-phase synchronous motor. The inverter 6 is coupled to the motor 9 via a power supply line 35. A wheel 90 is coupled to the motor 9 via a reduction gear, a drive shaft, and the like. The high-voltage battery 5a discharges to thereby supply driving electric power to the motor 9 via the inverters 6. During power driving, the motor 9 functions as a drive motor, which is supplied with driving electric power to generate power for driving the wheel 90, that is, a driving force for driving the vehicle. During regeneration, the motor 9 also functions as a generator, and may be driven by power transmitted from the wheel 90 as the vehicle speed decreases to thereby generate electric power. Electric power generated by the motor 9 is supplied to the high-voltage battery 5a via the inverters 6, whereby the high-voltage battery 5a can be charged.

The temperature controller 7 has a first device and a second device as part of a thermal system for performing heat management in the vehicle. The first device is an air conditioner for controlling the temperature of air inside in the vehicle cabin, and the first device can heat (heating) or cool (cooling) an interior of the vehicle cabin by receiving temperature cooling electric power from the high-voltage battery 5a. The first device is, for example, a heat pump fitted with an electric compressor configured to operate using the temperature controlling electric power and a heat exchanger. The first device may be an electric heater, such as a PTC heater, which operates using the temperature controlling electric power. The second device is a battery heater/cooler for controlling the temperature of the high-voltage battery 5a, and the second device can heat or cool the high-voltage battery 5a by receiving temperature controlling electric power from the high-voltage battery 5a. The second device is, for example, the heat pump common to the first device, and the second device may include a temperature controlling circuit through which a refrigerant of the air conditioner circulates. The second device may heat or cool the inverter 6.

The auxiliary device 8 includes electrical components and control units for indirectly assisting in driving the vehicle, and is coupled to the low-voltage battery 5b via a power supply line 34. The low-voltage battery 5b is a secondary battery having a voltage lower than that of the high-voltage battery 5a. The auxiliary device 8 operates by receiving auxiliary electric power from the low-voltage battery 5b. The electrical components include illuminating lamps, drive motors for such as wipers and power windows, defoggers or defrosters, and the like. A configuration may be adopted in which with the low-voltage battery 5b omitted, the electric power of the high-voltage battery 5a may be supplied directly to the auxiliary device 8 via the DC/DC converter 50.

As illustrated in FIG. 1, a control system of the electric vehicle includes a battery control unit 2, a motor control unit 3, a temperature control unit 4, and an EV control unit 1. Part or all of the control units 1 to 4 may be made up of, for example, a microcomputer or a microprocessor unit. The microcomputer or the like may have a general configuration in which a central processing unit (CPU) configured to execute various arithmetic operations, a read-only memory (ROM) configured to store various control programs, a random access memory (RAM) used as a work area for data storage and program execution, and an input/output interface (I/O) are provided, and these constituent devices are coupled to each other by a bidirectional common bus. Part or all of these control units may be configured by updatable firmware, for example, or may be a program module executed by a command from CPU, for example.

These control units 1 to 4 are coupled to each other via signal lines 21, 23, and 25, which are communication lines such as a controller area network (CAN), and exchange control information or various pieces of information on a control target with each other.

The battery control unit 2 is coupled to the high-voltage battery 5a via the signaling line 22. The high-voltage battery 5a includes a battery sensor 500. The battery sensor 500 detects states of the high-voltage battery 5a, that is, a temperature, voltage, current, and the like of the high-voltage battery 5a, and outputs the detected states of the high-voltage battery 5a to the battery control unit 2. The battery control unit 2 calculates, for example, a state of charge (SOC), a functional state, a degree of deterioration of the high-voltage battery 5a based on the received information and outputs the calculated information to the EV control unit 1 and the like.

The motor control unit 3 is coupled to the inverter 6 via the signal line 24. Information on a current (driving electric power) at the motor 9 is inputted into the motor control unit 3 from the inverter 6, and a signal indicating a revolution speed of the motor 9 is inputted into the motor control unit 3 from the motor 9. The motor control unit 3 calculates a command signal based on the received information and outputs the command signal calculated to the inverter 6, whereby the motor control unit 3 controls the torque or revolution speed of the motor 9.

The temperature control unit 4 is coupled to the temperature controller 7 via a signal line 26. Information, for example, on a current (temperature controlling electric power) at the controller 7 is inputted into the temperature control unit 4. The temperature control unit 4 calculates a command signal based on the received information and outputs the command signal calculated to the temperature controller 7, whereby the temperature control unit 4 controls the temperature controller 7. As a result, the temperature control unit 4 functions as part of the thermal system by controlling the temperature in the interior of the vehicle cabin, the high-voltage battery 5a, and the like.

The EV control unit 1 is coupled to the auxiliary device 8 via a signal line 27. The EV control unit 1 calculates command signals based on the information received by way of the signal lines 21, 23, 25, 27, and the like, and outputs the command signals calculated to the auxiliary device 8, the motor control unit 3, and the temperature control unit 4. The EV-control unit 1 controls the electric power of the vehicle based on the state of the high-voltage battery 5a and the like in a unified fashion, and controls the operating states of the auxiliary device 8, the motor 9, and the temperature controller 7. As a result, the EV control unit 1 functions as an electric power supply control apparatus for the vehicle. Note that the signal lines 21 to 27 are simply signal transmission paths, and the signal lines may transmit signals not only in a wired fashion but also wirelessly.

Figure 2:
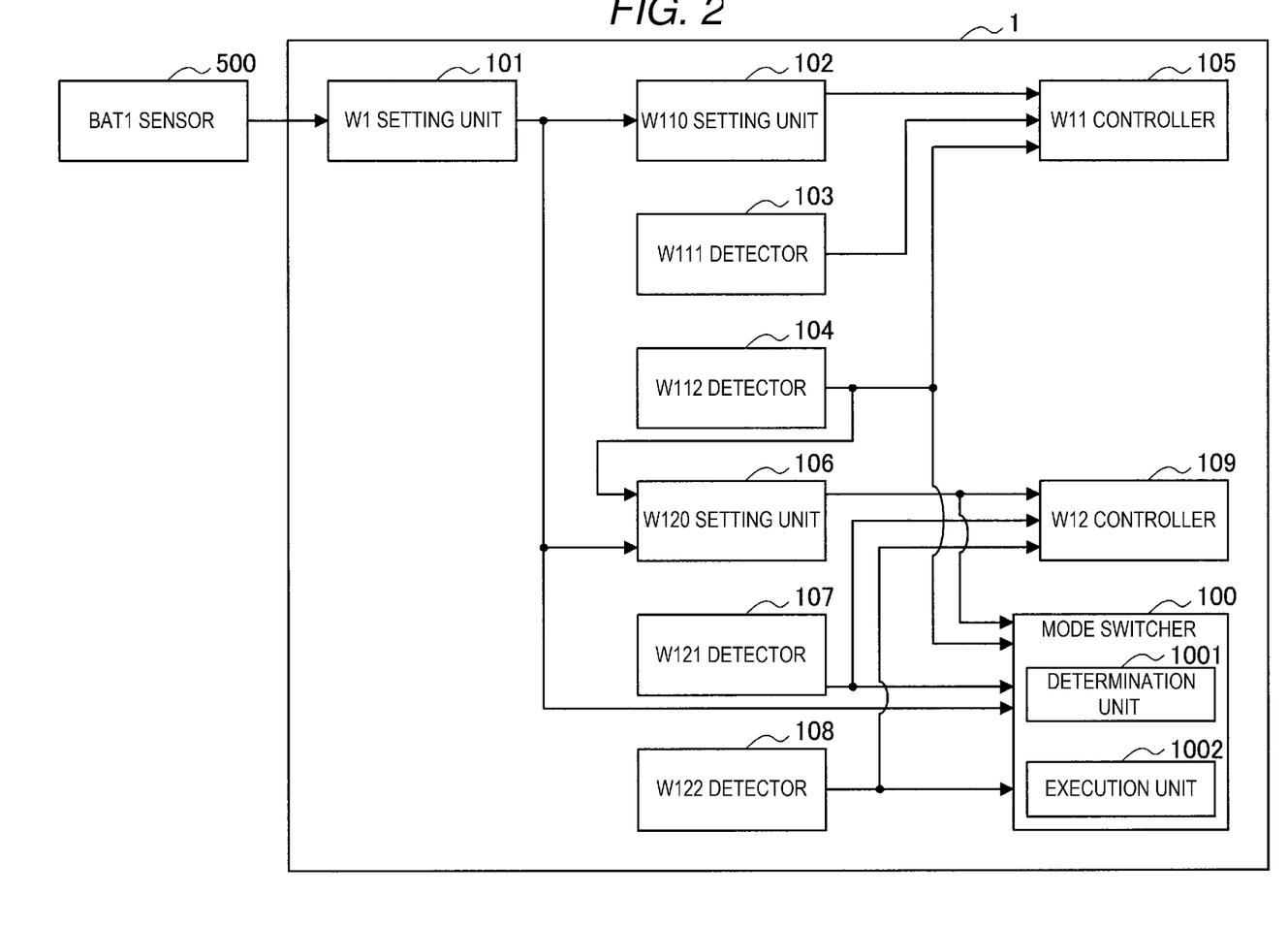
FIG. 2 is a functional block diagram of an EV control unit according to the embodiment.

As illustrated in FIG. 2, the EV control unit 1 includes, as individual functional units, a total electric power upper limit value setting unit 101, a first electric power upper limit value setting unit 102, a first electric power request value detector 103, a first electric power actual value detector 104, a first electric power controller 105, a second electric power upper limit value setting unit 106, a second electric power request value detector 107, a second electric power actual value detector 108, a second electric power controller 109, and a mode switcher 100.

The total electric power upper limit value setting unit 101 sets a total electric power upper limit value W1. Specifically, the unit 101 calculates allowable output electric power W0, which is electric power that the high-voltage battery 5a can output, based on a signal from the battery sensor 500. The unit 101 sets a value obtained by subtracting auxiliary device operating electric power W2, which is electric power for use in operating the auxiliary device 8, from the allowable output electric power W0 as the total electric power upper limit value W1. The total electric power upper limit value W1 is an upper limit value of electric power usable for at least one of the motor 9 and the temperature controller 7, in the electric power W0 that the high-voltage battery 5a can output. The auxiliary device operating electric power W2 may be a predetermined value set in advance, or may be a value calculated based on a signal from the auxiliary device 8 or the low-voltage battery 5b.

Figure 3:
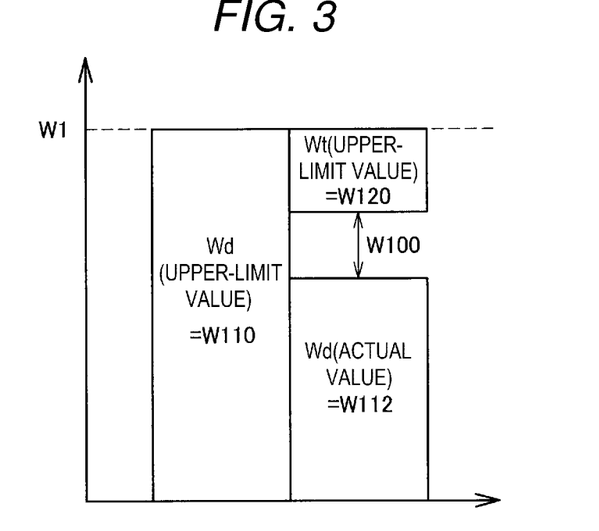
FIG. 3 is a graph illustrating magnitudes of variables at the time of a driving prioritizing mode in the embodiment.
Figure 4:
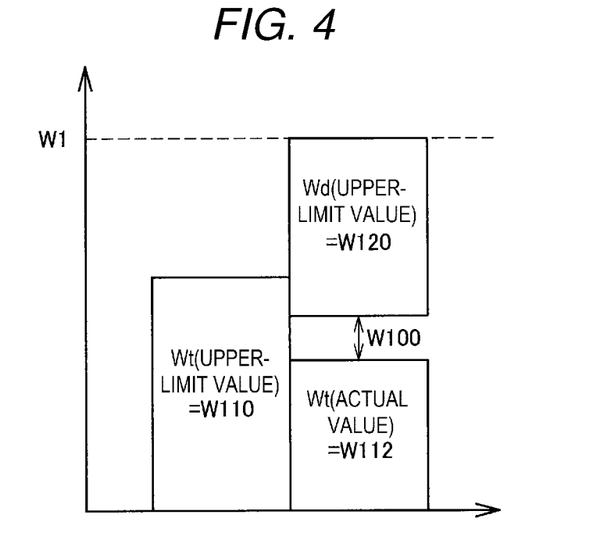
FIG. 4 is a graph illustrating magnitudes of variables at the time of a temperature control prioritizing mode in the embodiment.

The first electric power upper limit value setting unit 102 sets an upper limit value W110 of the first electric power W11 to a predetermined value equal to or less than the total electric power upper limit value W1. Specifically, when the driving electric power Wd is set to the first electric power W11, that is, when the driving prioritizing mode is selected, as illustrated in FIG. 3, the unit 102 sets the driving electric power upper limit value W110 (permissible driving electric power) to the total electric power upper limit value W1. When the value of a rated output (a rated value) of the motor 9 is equal to or less than the total electric power upper limit value W1, the unit 102 may set the driving electric power upper limit value W110 to the rated value. When the temperature controlling electric power Wt is set to the first electric power W11, that is, when the temperature control prioritizing mode is selected, as illustrated in FIG. 4, the unit 102 sets the temperature controlling electric power upper limit value W110 (permissible temperature controlling electric power to the value of a rated output (a rated value) of the temperature controller 7. This rated value is a predetermined value equal to or less than the total electric power upper limit value W1. When the value of the rated output of the temperature controller 7 is equal to or greater than the total electric power upper limit value W1, the unit 102 may set the temperature controlling electric power upper limit value W110 to the total electric power upper limit value W1.

The first electric power request value detector 103 detects a request value W111 for the first electric power W11. When the first electric power W11 is the driving electric power Wd, the request value W111 is determined in accordance with, for example, the magnitude of a driving force that the driver requests the vehicle to output. The magnitude of the requested driving force can be detected based on, for example, an operation or depression amount of an accelerator pedal. When the first electric power W11 is the temperature controlling electric power, the request value W111 is determined in accordance with, for example, an operation amount of the first device (the air conditioner) of the temperature controller 7. This operation amount can be detected, for example, based on a set temperature for the interior of the vehicle cabin. The first electric power actual value detector 104 detects an actual value of the first electric power W11, that is, an actual value W112. The first electric power controller 105 executes a feedback control so that the actual value 112 of the first electric power W11 converses to the request value W111 within a range up to the upper limit value W110.

The second electric power upper limit value setting unit 106 sets an upper limit value W120 of the second electric power W12 so that a sum (W120+W112) of the upper limit value W120 of the second electric power W12 and the actual value W112 of the first electric power W11 is equal to or less than the total electric power upper limit value W1. Specifically, the unit 106 sets the upper limit value W120 of the second electric power W12 so that the sum (W120+W112) is smaller than the total electric power upper limit value W1. As a result, as illustrated in FIGS. 3 and 4, a minimum margin W100 can be set, the minimum margin W100 constituting a difference between the sum (W120+W112) and the total electric power upper limit W1. The minimum margin W100 is a minimum value of the margin W10, which is a difference between a sum (W112+W122) of the actual value W112 of the first electric power W11 and an actual value W122 of the second electric power W12 and the total electric power upper limit value W1.

The second electric power request value detector 107 detects a request value W121 of the second electric power W12 in the same way as the way in which the first electric power request value detector 103 does. The second electric power actual value detector 108 detects an actual value W122 of the second power W12. The second electric power controller 109 executes a feedback control so that the actual value W122 of the second electric power W12 converges to the request value W121 within a range up to the upper limit value W120 or smaller.

The mode switcher 100 switches the priority modes of the vehicle between the driving prioritizing mode and the temperature control prioritizing mode. The mode switcher 100 includes a determination unit 1001 for determining on switching of the priority modes, and an execution unit 1002 for executing switching of the priority modes.

The determination unit 1001 determines on switching to the driving prioritizing mode, for example, when the upper limit value W120 of the driving electric power Wd=W12 decreases below a predetermined minimum value as the SOC of the high-voltage battery 5a decreases, causing the total electric power upper limit value w1 to decrease during the temperature control prioritizing mode. Alternatively, the determination unit 1001 determines on switching to the driving prioritizing mode when the request value W121 of the driving electric power Wd=W12 exceeds the upper limit value W120 and a difference between the request value W121 and the upper limit value W120 becomes a predetermined value (for example, the minimum margin W100) or greater. This may occur when the driver depresses the accelerator pedal largely or quickly. In addition, a first mode prioritizing the driving performance of the vehicle and a second mode prioritizing the economy of the vehicle are provided as modes for controlling the driving force of the vehicle, and the driver switches the driving force control modes between these two modes. In this case, when the driver switches from the second mode to the first mode during the temperature control prioritizing mode, the determination unit 1001 may determine on switching to the driving prioritizing mode.

On the other hand, the determination unit 1001 determines on switching to the temperature control prioritizing mode when the request value W121 of the temperature controlling electric power Wt=W12 exceeds the upper limit value W120 thereof, and a difference between the request value W121 and the upper limit value W120 becomes a predetermined value (for example, the minimum margin W100) or greater during the driving prioritizing mode. This may occur when a difference between a set temperature in the first device (air conditioner) of the temperature controller 7 and the temperature in the interior of the vehicle cabin is a predetermined value or greater. Alternatively, the determination unit 1001 may determine on switching to the temperature control prioritizing mode when the driver switches the driving force control modes from the first mode to the second mode during the driving prioritizing mode.

While the priority modes are switched between the driving prioritizing mode and the temperature control prioritizing mode, the execution unit 1002 causes an increasing rate ΔW2 of the increasing electric power to be equal to or slower than a decreasing rate ΔW1 of the decreasing electric power so that the sum of the driving electric power Wd and the temperature controlling electric power Wd becomes equal to or smaller than the total electric power upper limit value W1.

Next, the working effect will be described. In each of the priority modes, the EV control unit 1 supplies the first electric power W11 with prioritizing over the second electric power W12 within a range up to the predetermined upper limit value W110 or smaller. Therefore, the magnitude of one electric power of the driving electric power and the temperature controlling electric power is not limited in advance in any way by the upper limit value of the other electric power, and the magnitude of the one electric power is limited by its own limited value. Therefore, since a usable range of each electric power can be expanded, the motor performance or the driving performance of the vehicle by the motor 9 using the driving electric power and temperature controlling performance by the temperature controller 7 using the temperature controlling electric power can be made compatible with each other at a high degree. For example, in the driving prioritizing mode, the EV control unit 1 sets the upper limit value of the driving electric power to the total electric power upper limit value W1. Therefore, since the usable range of the driving electric power can be expanded, the driving performance of the vehicle by the motor 9 using the driving electric power can be improved.

Specifically, the EV control unit 1 sets the upper limit value W110 of the first electric power W11 to a predetermined value which is equal to or smaller than the total electric power upper limit value W1 and is not limited by the second electric power W12. Since a usable amount of the first electric power W11 is not limited in advance by the upper limit value W120 of the second electric power W12, the usable range of the first electric power W11 can be expanded. On the other hand, the EV control unit 1 sets the upper limit value W120 of the second electric power W12 so that the sum of the upper limit value W120 of the second electric power W12 and the actual value W112 of the first electric power W11 becomes equal to or smaller than the total electric power upper limit value W1. As a result, the sum of the actual value W112 of the first electric power W11 and the actual value W122 of the second electric power W12 can be restrained from exceeding the total electric power upper limit value W1. In addition, since the upper limit value W120 of the second electric power W12 is finely set in accordance with the actual value W112 of the first electric power W11, a usable range of the second electric power W12 can be effectively expanded. From this viewpoint, the first electric power W11 used in setting the upper limit value W120 of the second electric power W12 is not limited to the actual value W112 but may be the request value W111.

In each of the priority modes, the EV control unit 1 sets the upper limit value W120 of the second electric power W12 so that the sum of the upper limit value W120 of the second electric power W12 and the actual value W112 of the first electric power W11 is smaller than the total electric power upper limit value W1. Therefore, the margin W10, which is the difference between the sum of the actual value of the driving electric power Wd and the actual value of the temperature controlling electric power Wt and the total electric power upper limit value W1, can be set. By using this margin W10 as an allowance, even when, for example, one of the temperature controlling electric power and the driving electric power increases in each priority mode, a risk of the sum of both the electric powers exceeding temporarily the total electric power upper limit value W1 due to a delay in control of the other electric power can be avoided. From this viewpoint, the first electric power W11 for use in setting the margin W10 is not limited to the actual value W112 but may be the request value W111.

While switching the priority modes between the driving prioritizing mode and the temperature control prioritizing mode, the EV control unit 1 controls the driving electric power Wd or the temperature controlling electric power Wt so that the sum of the actual value of the driving electric power Wd and the actual value of the temperature controlling electric power Wt becomes equal to or greater than the total electric power upper limit value W1. In other words, the EV control unit 1 controls the driving electric power Wd or the temperature controlling electric power Wt so that the margin W10 become zero or greater while the priority modes are switched as described above. As a result, the sum of the actual value of the driving electric power Wd and the temperature controlling electric power Wt can be restrained from exceeding the total electric power upper limit value W1 while the priority modes are switched as described above.

When expanding the respective usable ranges of the first and second electric powers as described above, a sum of an upper limit value W110 of the first electric power W11 in the priority mode before switching and an upper limit value W110 of the first electric power W11 in the priority mode after switching may constitute a great value exceeding the total electric power upper limit value W1. Therefore, when the priority modes are switched, there is a high possibility that the sum of the driving electric power Wd and the temperature controlling electric power Wt exceeds the total electric power upper limit value W1 due to a decrease in electric power prioritized before switching being unable to catch up with an increase in electric power prioritized after switching. On the other hand, while the priority modes are switched, the EV control unit 1 controls the driving electric power Wd or the temperature controlling electric power Wt so that the sum of the actual value of the driving electric power Wd and the actual value of the temperature controlling electric power Wt becomes equal to or smaller than the total electric power upper limit value W1. This can suppress the emergence of the possibility described above effectively.

Figure 5:
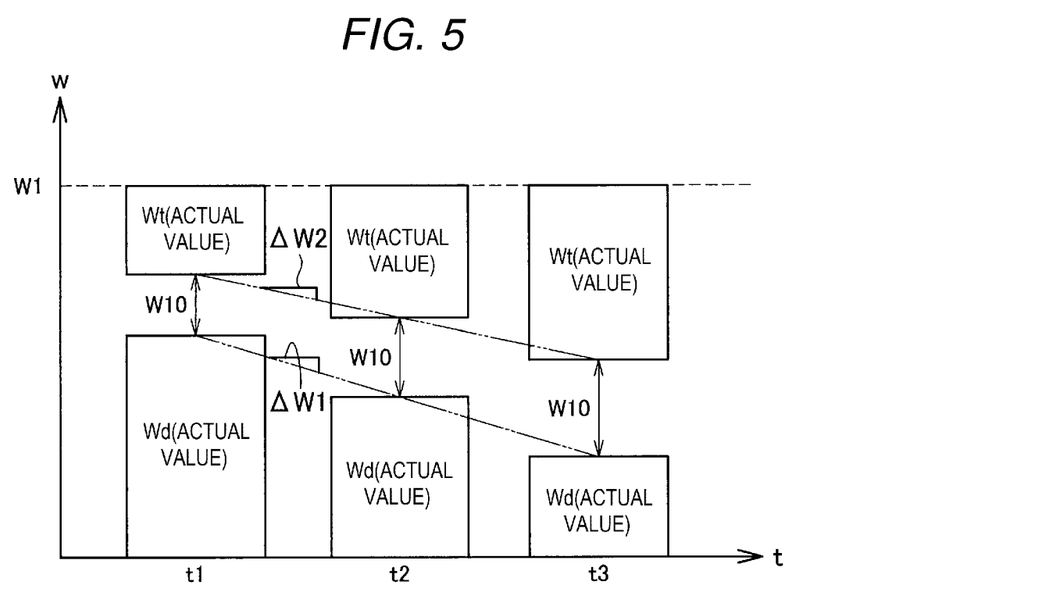
FIG. 5 is a time chart illustrating transitions of individual electric powers at the time of changing the modes in the embodiment (Modified Examples 4, 5).

FIG. 5 illustrates transitions of the driving electric power and the temperature controlling electric power when the actual value of the driving electric power decreases while the actual value of the temperature controlling electric power increases at the time of switching from the driving prioritizing mode to the temperature control prioritizing mode. A time t1 denotes a timing immediately before switching the priority modes, a time t2 denotes a timing during the switching, and a time t3 denotes a timing immediately after the switching. In such a case, the execution unit 1002 of the EV control unit 1 controls the driving electric power Wd or the temperature controlling electric power Wt so that the increasing rate $\Delta W2$ of an actual value of the temperature controlling electric power Wt, which is the increasing electric power, becomes equal to or smaller than the decreasing rate$\Delta W1$ ($>0$) of an actual value of the driving electric power Wd, which is the decreasing power.

For example, in order to suppress a sudden change in driving electric power Wd, that is, a sudden change in driving force to thereby improve the driving performance of the drive feel of the vehicle, a speed at which the actual value of the driving electric power Wd changes, that is, the increasing rate$\Delta W2$ or the decreasing rate$\Delta W1$ may be limited to a predetermined range. In the case where the decreasing rate$\Delta W1$ of the actual value of the driving electric power Wd is limited in this manner, the execution unit 1002 causes the increasing rate$\Delta W2$ of the actual value of the temperature controlling electric power Wt to be equal to or smaller than a limit value ($>0$) of the decreasing rate$\Delta W1$ of the driving electric power Wd during switching the priority modes. Similarly, in order to suppress a sudden change in temperature controlling electric power Wt, a speed at which the actual value of the temperature controlling electric power Wt changes may be limited to a predetermined range. In such a case, the execution unit 1002 may cause the decreasing rate$\Delta W1$ ($>0$) of the actual value of the driving electric power Wd to be equal to or greater than the limit value of the increasing rate$\Delta W2$ of the temperature controlling electric power Wt during switching of the priority modes.

In order to control the increasing rate$\Delta W2$ of the actual value of the increasing electric power, the execution unit 1002 may control the increasing rate of the upper limit value of the increasing electric power in place of controlling directly the increasing rate$\Delta W2$ of the actual value during switching the priority modes.

Figure 6:
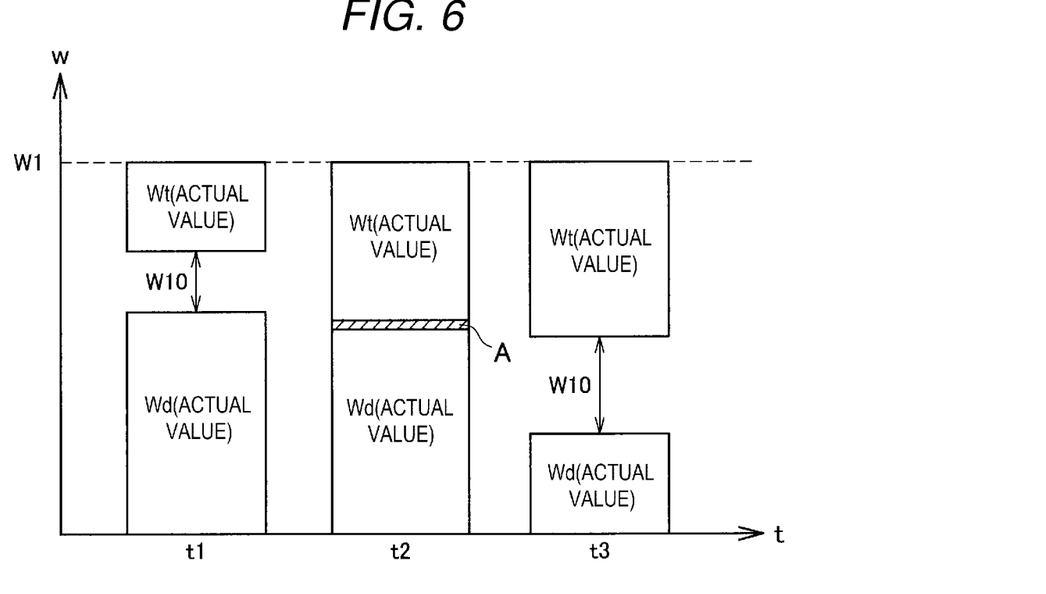
FIG. 6 is a time chart illustrating transitions of individual electric powers at the time of switching modes in a comparison example.

In this way, the sum of the actual value of the driving electric power Wd and the actual value of the temperature controlling electric power Wt can be equal to or smaller than the total electric power upper limit value W1 as illustrated in FIG. 5 by causing the increasing rate$\Delta W2$ of the increasing electric power to be equal to or smaller than the decreasing rate$\Delta W1$ ($>0$) of the decreasing electric power during switching the priority modes. More specifically, a magnitude of the margin W10 at an arbitrary time t2 during switching can be equal to or greater than a magnitude of the margin W10 at a time t1 immediately before switching. Therefore, a situation as illustrated in FIG. 6, that is, a situation in which the sum of the actual value of the driving electric power Wd and the actual value of the temperature controlling electric power Wt exceeds the total electric power upper limit value W1 transiently at the time t2 during switching is avoided. In FIG. 6, an overlapping portion A between the actual value of the driving electric power Wd and the actual value of the temperature controlling electric power Wt indicates an amount by which the sum in question exceeds the total electric power upper limit value W1. This situation may occur due to a difference between the changing speed of the driving electric power Wd and the changing speed of the temperature controlling electric power Wt, for example, due to the increasing rate$\Delta$W2 of the actual value of the temperature controlling electric power Wt being greater than the limit value of the decreasing rate$\Delta$W1 of the driving electric power Wd.

The same will apply to the case where the increasing electric power is the driving electric power Wd and the decreasing power is the temperature controlling electric power Wt. For example, when the increasing rate$\Delta$W2 of the actual value of the driving electric power Wd is limited, the execution unit 1002 may cause the decreasing rate$\Delta$W1 of the actual value of the temperature controlling electric power Wt to be equal to or greater than the limit value of the increasing rate$\Delta$W2 of the driving electric power Wd during switching the priority modes. The limit values of the decreasing rate$\Delta$W1 and the increasing rate$\Delta$W2 of the actual value of the driving electric power Wd may vary depending on the states of the vehicle such as vehicle speed or acceleration thereof, and the limit values are set greater when the first mode prioritizing the driving performance is selected than when the second mode prioritizing the economy is selected. In the case where a control is performed to reduce the looseness of gears between the motor 9 and the wheel 90 after the direction of the driving force is reversed from a negative direction to a positive direction as a result of the operation state of the motor 9 changing from regeneration to power driving, the limit value of the increasing rate$\Delta$W2 of the driving electric power Wd can be set greater than when the motor 9 is driven normally.

The execution unit 1002 may use a command value instead of or in addition to the actual values of the driving electric power Wd and the temperature controlling electric power Wt as a parameter for causing the sum to be equal to or smaller than the total electric power upper limit value W1 during switching the priority modes. The electric power command value is, for example, a command value that the EV control unit outputs to the motor control unit 3 or the like. For example, the execution unit 1002 may control the driving electric power Wd or the temperature controlling electric power Wt so that an increasing rate of a command value of the increasing e;ectroc power becomes equal to or slower than a decreasing rate of a command value of the decreasing electric power.

In addition, the execution unit 1002 may adjust the increasing rate$\Delta$W2, the decreasing rate$\Delta$W1, or the margin W10 in accordance with the control response of the driving electric power Wd or the temperature controlling electric power Wt. For example, when the control response of the decreasing electric power is low, the execution unit 1002 may set the decreasing rate$\Delta$W1 (>0) of the decreasing electric power greater than when the control response in question is high.

Thus, the execution unit 1002 is described as causing the increasing rate$\Delta$W2 of the increasing electric power to be equal to or smaller than the decreasing rate$\Delta$W1 of the decreasing electric power while the driving prioritizing mode is switched to the temperature control prioritizing mode or vice versa in order that the sum of the driving electric power Wd and the temperature controlling electric power Wt becomes equal to or smaller than the total electric power upper limit value W1. In order to achieve the above object, various modified example as listed below can also be adopted.

Modified Example 1

Figure 7:
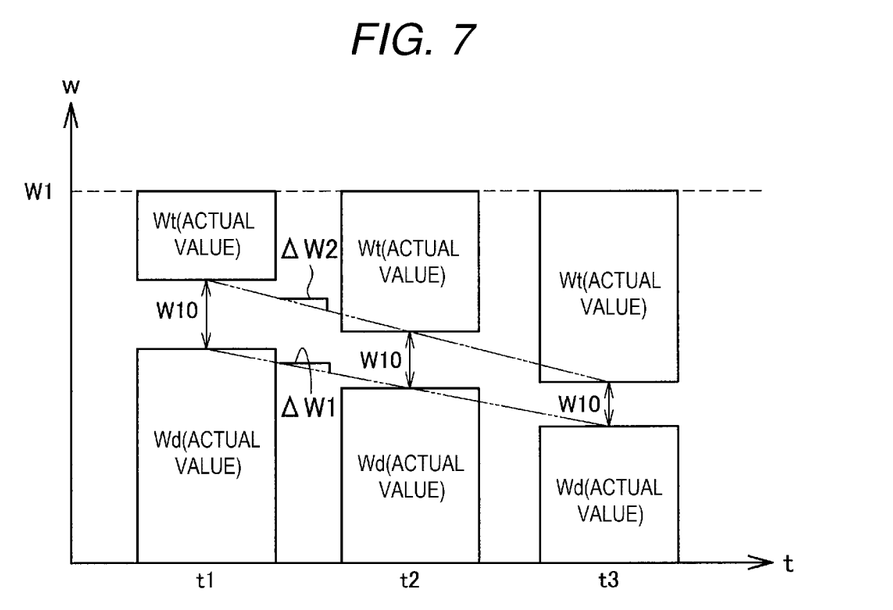
FIG. 7 is a time chart illustrating transitions of individual electric powers at the time of changing the modes in the embodiment (Modified Examples 1, 2, 6 to 8).

While the driving prioritizing mode is switched to the temperature control prioritizing mode or vice versa, when the increasing rate$\Delta$W2 of the increasing electric power exceeds the decreasing rate$\Delta$W1 (>0) of the decreasing electric power as illustrated in FIG. 7, the execution unit 1002 may control the driving electric power Wd or the temperature controlling electric power Wt so that the difference between the increasing rate$\Delta$W2 and the decreasing rate$\Delta$W1 stays within the predetermined range. In this way, even when the increasing rate$\Delta$W2 exceeds the decreasing rate$\Delta$W1, the sum of both the electric powers Wd, Wt can be restrained from exceeding the total electric power upper limit value W1 by limiting the difference between both the speeds $\Delta$W1, $\Delta$W2.

Modified Example 2

While the driving prioritizing mode is switched to the temperature control prioritizing mode or vice versa, when the increasing rate$\Delta$W2 of the increasing electric power exceeds the decreasing rate$\Delta$W1 (>0) of the decreasing electric power as illustrated in FIG. 7, with the margin W10 staying at the predetermined value or smaller, the execution unit 1002 may control the driving electric power Wd or the temperature controlling electric power Wt so that the difference between the increasing rate$\Delta$W2 and the decreasing rate$\Delta$W1 stays within the predetermined range. In this way, when the increasing rate$\Delta$W2 exceeds the decreasing rate$\Delta$W1, with the margin W10 remaining relatively small, the sum of both the electric powers Wd, Wt can be restrained from exceeding the total electric power upper limit value W1 by limiting the difference between both the speeds $\Delta$W1, $\Delta$W2.

Modified Example 3

The execution unit 1002 may control the driving electric power Wd or the temperature controlling electric power Wt so that the magnitude of the margin W10 is within a predetermined range with respect to the magnitude of the margin W10 immediately before the start of the switching (the time t1) while the driving prioritizing mode is switched to the temperature control prioritizing mode or vice versa. In this way, the sum of both the electric powers Wd, Wt can be restrained from exceeding the total electric power upper limit value W1 by restricting the magnitude of the margin W10 during mode switching from changing from the magnitude of the margin W10 immediately before the start of the switching.

Modified Example 4

The execution unit 1002 may control the driving electric power Wd or the temperature controlling electric power Wt so that the magnitude of the margin W10 becomes equal to or greater than the magnitude of the margin W10 immediately before the start of the switching (the time t1) as illustrated in FIG. 5 while the driving prioritizing mode is switched to the temperature control prioritizing mode or vice versa. In this way, the sum of both the electric powers Wd, Wt can be restrained from exceeding the total electric power upper limit value W1 more effectively by controlling so that the magnitude of the margin W10 during mode switching becomes equal to or greater than the magnitude of the margin W10 immediately before the start of the switching.

Modified Example 5

The execution unit 1002 may control the driving electric power Wd or the temperature controlling electric power Wt so that the magnitude of the margin W10 maintains the magnitude of the margin W10 immediately before the start of the switching (the time t1) as illustrated in FIG. 5 or increases therefrom while the driving prioritizing mode is switched to the temperature control prioritizing mode or vice versa. In this way, the sum of both the electric powers Wd, Wt can be restrained from exceeding the total electric power upper limit value W1 more effectively by controlling so that the magnitude of the margin W10 during mode switching maintains the magnitude of the margin W10 immediately before the start of the switching or increases therefrom.

Modified Example 6

When the driving electric power Wd or the temperature controlling electric power Wt changes in such a way as to reduce the margin W10 as illustrated in FIG. 7, the execution unit 1002 may control the driving electric power Wd or the temperature controlling electric power Wt so that the decreasing rate of the margin W10 remains within a predetermined range while the driving prioritizing mode is switched to the temperature control prioritizing mode or vice versa. In this way, the sum of both the electric powers Wd, Wt can be restrained from exceeding the total electric power upper limit value W1 by controlling the decreasing rate of the margin W10 even when the margin W10 decreases.

Modified Example 7

When the driving electric power Wd or the temperature controlling electric power Wt changes in such a way as to decrease the margin W10 as illustrated in FIG. 7, with the margin W10 remaining equal to or smaller than the predetermined value, the execution unit 1002 may control the driving electric power Wd or the temperature controlling electric power Wt so that the decreasing rate of the margin W10 remains within the predetermined range while the driving prioritizing mode is switched to the temperature control prioritizing mode or vice versa. In this way, the sum of both the electric powers Wd, Wt can be restrained from exceeding the total electric power upper limit value W1 more effectively by controlling the decreasing rate of the margin W10 in the case where the margin W10 is relatively small when the margin W10 decreases.

Modified Example 8

The execution unit 1002 may control the driving electric power Wd or the temperature controlling electric power Wt so that a ratio of the decreasing rate of the margin W10 to the magnitude of the margin 10 immediately before the start of the switching (the time t1) becomes equal to or smaller than a predetermined value while the driving prioritizing mode is switched to the temperature control prioritizing mode or vice versa, when the margin S10 changes in such away as to decrease the margin W10 as illustrated in FIG. 7. In this way, since a time spent until the margin W10 comes near zero is ensured to some extent by limiting the ratio of the decreasing rate of the margin W10 to the magnitude of the margin W10 immediately before the start of the switching the modes, the sum of both the electric powers Wd, Wt can be restrained from exceeding the total electric power upper limit value W1 more effectively.

Thus, while the preferred embodiment of the disclosure has been described in detail by reference to the accompanying drawings, the disclosure is not limited to the embodiment. It is obvious that those having ordinary skill in the art to which the disclosure pertains can arrive at various alterations or modifications without departing from the scope of the technical idea described in claims, and it is understood that these alterations or modifications naturally fall within the technical scope of the disclosure.

For example, the vehicle to which the power supply control apparatus and the power supply control method of the disclosure are applied may be any vehicle capable of generating a driving force by an electric motor and hence is not limited to an electric vehicle but may be, for example, a hybrid vehicle that includes an internal combustion engine in addition to the electric motor as a source of driving force while being capable of running in an EV mode. The hybrid vehicle may be a plug-in hybrid vehicle that can be charged from an external power supply source.

The invention claimed is:

1. An electric power supply control apparatus for a vehicle, the vehicle comprising:
   a battery;
   an electric motor configured to generate a driving force of the vehicle by receiving electric power from the battery; and
   a temperature controller configured to heat or cool at least one of a vehicle cabin and the battery by receiving electric power from the battery,
   the electric power supply control apparatus for the vehicle being configured to
   execute:
      a driving prioritizing mode in which a supply of driving electric power which used by the electric motor is prioritized over a supply of temperature controlling electric power which is used by the temperature controller within a range of an upper limit value of a predetermined driving electric power; and
      a temperature control prioritizing mode in which the supply of the temperature controlling electric power is prioritized over the supply of the driving electric power within a range of an upper limit value of a predetermined temperature controlling electric power upper limit value, and
   while the driving prioritizing mode and the temperature control prioritizing mode are switched over by a switch according to a request value of the driving electric power and a request value of the temperature controlling electric power, control the driving electric power or the temperature controlling electric power so that a sum of the driving electric power and the temperature controlling electric power stays at a total electric power upper limit value or smaller, the total electric power upper limit value being an upper limit value of electric power that can be used by at least one of the electric motor and the temperature controller within electric power that can be output by the battery.

2. The electric power supply control apparatus for the vehicle according to claim 1, wherein
   in case where, while the driving prioritizing mode and the temperature control prioritizing mode are switched over by the switch according to a predetermined condition identified by a determining unit, one of the driving electric power and the temperature controlling electric power increases and the other one decreases, the electric power supply control apparatus controls the driving electric power or the temperature controlling electric power in such manner that an increasing rate of the increasing electric power is equal to or slower than a decreasing rate of the decreasing electric power.

3. The electric power supply control apparatus for the vehicle according to claim 1, wherein
in a case where, while the driving prioritizing mode and the temperature control prioritizing mode are switched over, one of the driving electric power and the temperature controlling electric power increases and the other one decreases, and the increasing rate exceeds the decreasing rate, the electric power supply control apparatus controls the driving electric power or the temperature controlling electric power in such a manner that a difference between an increasing rate of the increasing electric power and a decreasing rate of the decreasing electric power stays within a predetermined range.

4. The electric power supply control apparatus for the vehicle according to claim 3, wherein
in a case where, while the driving prioritizing mode and the temperature control prioritizing mode are switched over, the increasing rate exceeds the decreasing rate with a margin staying at a predetermined value or smaller, the margin being a difference between a sum of the driving electric power and the temperature controlling electric power and the total electric power upper limit value, the electric power supply control apparatus controls the driving electric power or the temperature controlling electric power in such a manner that a difference between the increasing rate and the decreasing rate stays within the predetermined range when.

5. The electric power supply control apparatus for the vehicle according to claim 1, wherein
in a case where, while the driving prioritizing mode and the temperature control prioritizing mode are switched over, the driving electric power or the temperature controlling electric power changes so as to decrease a margin that is a difference between a sum of the driving electric power and the temperature controlling electric power and the total electric power upper limit value, the electric power supply control apparatus controls the driving electric power or the temperature controlling electric power in such a manner that a decreasing rate of the margin stays within a predetermined range.

6. The electric power supply control apparatus for the vehicle according to claim 5, wherein
in a case the decreasing rate of the margin is a predetermined value or smaller while the driving prioritizing mode and the temperature control prioritizing mode are switched over, the electric power supply control apparatus controls the driving electric power or the temperature controlling electric power in such a manner that the decreasing rate of the margin stays within the predetermined range.

7. The electric power supply control apparatus for the vehicle according to claim 1, wherein
in a case where, while the driving prioritizing mode and the temperature control prioritizing mode are switched over, the driving electric power or the temperature controlling electric power changes so as to decrease a margin that is a difference between a sum of the driving electric power and the temperature controlling electric power and the total electric power upper limit value, the electric power supply control apparatus controls the driving electric power or the temperature controlling electric power in such a manner that a ratio of a decreasing rate of the margin to a magnitude of the margin immediately before the driving prioritizing mode and the temperature control prioritizing mode are switched over stays at a predetermined value or smaller.

8. The electric power supply control apparatus for the vehicle according to claim 1, wherein, while the driving prioritizing mode and the temperature control prioritizing mode are switched over, the electric power supply control apparatus controls the driving electric power or the temperature controlling electric power in such a manner that a magnitude of a margin that is a difference between a sum of the driving electric power and the temperature controlling electric power and the total electric power upper limit value stays within a predetermined range relative to a magnitude of the margin immediately before the driving prioritizing mode and the temperature control prioritizing mode are switched over.

9. The electric power supply control apparatus for the vehicle according to claim 1, wherein, while the driving prioritizing mode and the temperature control prioritizing mode are switched over, the electric power supply control apparatus controls the driving electric power or the temperature controlling electric power in such a manner that a magnitude of a margin that is a difference between a sum of the driving electric power and the temperature controlling electric power and the total electric power upper limit value becomes equal to or greater than a magnitude of the margin immediately before the driving prioritizing mode and the temperature control prioritizing mode are switched over.

10. The electric power supply control apparatus according to claim 9, wherein, while the driving prioritizing mode and the temperature control prioritizing mode are switched over, the electric power supply control apparatus controls the driving electric power or the temperature controlling electric power in such a manner that a magnitude of the margin maintains a magnitude of the margin immediately before the driving prioritizing mode and the temperature control prioritizing mode are switched over or increases therefrom.

11. An electric power supply control method for a vehicle, the vehicle comprising:
a battery;
an electric motor configured to generate a driving force of the vehicle by receiving electric power from the battery; and
a temperature controller configured to heat or cool at least one of a vehicle cabin and the battery by receiving electric power from the battery,
the method comprising:
executing
a driving prioritizing mode in which a supply of driving electric power which used by the electric motor is prioritized over a supply of temperature controlling electric power which is used by the temperature controller within a range of an upper limit value of a predetermined driving electric power, and
a temperature control prioritizing mode in which the supply of the temperature controlling electric power is prioritized over the supply of the driving electric power within a range of an upper limit value of a predetermined temperature controlling electric power upper limit value; and
controlling the driving electric power or the temperature controlling electric power in such a manner that a sum of the driving electric power and the temperature controlling electric power stays at a total electric power upper limit value or smaller while the driving prioritizing mode and the temperature control prioritizing mode are switched over by a switch according to a request value of the driving electric power and a request value of the temperature controlling electric power, the total electric power upper limit value being an upper limit value of electric power that can be used by at least one of the electric motor and the temperature controller within electric power that can be output by the battery.

12. The electric power supply control apparatus for the vehicle according to claim 1, wherein the electric power supply control apparatus is configured to execute controlling the driving electric power or the temperature controlling electric power so that the sum of the driving electric power and the temperature controlling electric power stays at the total electric power upper limit value or smaller, the total electric power upper limit value being the upper limit value of electric power that is used by at least one of the electric motor and the temperature controller within electric power that is output by the battery.

13. The electric power supply control apparatus for the vehicle according to claim 1, wherein the electric power supply control apparatus is configured to execute controlling of the driving electric power or the temperature controlling electric power such that an increasing rate of increasing electric power is equal to or slower than a decreasing rate of decreasing electric power.

14. The electric power supply control method for the vehicle according to claim 11, wherein the controlling comprises controlling the driving electric power or the temperature controlling electric power so that the sum of the driving electric power and the temperature controlling electric power stays at the total electric power upper limit value or smaller, the total electric power upper limit value being the upper limit value of electric power that is used by at least one of the electric motor and the temperature controller within electric power that is output by the battery.

15. The electric power supply control method for the vehicle according to claim 11, wherein the controlling of the driving electric power or the temperature controlling electric power comprises such that an increasing rate of increasing electric power is equal to or slower than a decreasing rate of decreasing electric power.

16. An electric power supply control apparatus for a vehicle, the vehicle comprising:
  a battery;
  an electric motor configured to generate a driving force of the vehicle by receiving electric power from the battery; and
  a temperature controller configured to heat or cool at least one of a vehicle cabin and the battery by receiving electric power from the battery, the electric power supply control apparatus for the vehicle comprising:

a detector configured to detect a first request value of a driving electric power which used by the electric motor and a second request value of a temperature controlling electric power which used by the temperature controller;

a switcher configured to switch a priority mode to a driving prioritizing mode in which a supply of the driving electric power is prioritized over a supply of the temperature controlling electric power within a range of a first upper limit value, or a temperature control prioritizing mode in which the supply of the temperature controlling electric power is prioritized over the supply of the driving electric power within a range of a second upper limit value, based on the first request value and the second request value; and a controller configured to control the driving electric power and the temperature controlling electric power based on the first request value, the second request value and the priority mode, wherein the controller is configured to decrease the first upper limit value over a predetermined first period when the switcher switches the priority mode from the driving prioritizing mode to the temperature control prioritizing mode, and decrease the second upper limit value over a predetermined second period when the switcher switches the priority mode from the temperature control prioritizing mode to the driving prioritizing mode, wherein the controller is configured to control the driving electric power and the temperature controlling electric power so that a sum of the driving electric power and the temperature controlling electric power stays at a total electric power upper limit value or smaller while the first period and the second period, the total electric power upper limit value being an upper limit value of electric power that can be used by at least one of the electric motor and the temperature controller within electric power that can be output by the battery.

* * * * *